US011055505B2

(12) United States Patent
Powers et al.

(10) Patent No.: US 11,055,505 B2
(45) Date of Patent: *Jul. 6, 2021

(54) SYSTEM AND METHOD FOR RECOGNIZING DEFORMED LINEAR BARCODES FROM A STREAM OF VARIED FOCUS VIDEO FRAMES

(71) Applicant: eBay Inc., San Jose, CA (US)

(72) Inventors: Jeffrey Roger Powers, Boulder, CO (US); Vikas Muppiddi Reddy, Boulder, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,304

(22) Filed: Aug. 12, 2019

(65) Prior Publication Data

US 2020/0104559 A1 Apr. 2, 2020

Related U.S. Application Data

(63) Continuation of application No. 14/833,184, filed on Aug. 24, 2015, now Pat. No. 10,410,030, which is a
(Continued)

(51) Int. Cl.
*G06K 7/10* (2006.01)
*G06K 7/14* (2006.01)
*G06K 5/00* (2006.01)

(52) U.S. Cl.
CPC ............ *G06K 7/1473* (2013.01); *G06K 5/00* (2013.01); *G06K 7/10821* (2013.01); *G06K 7/14* (2013.01);
(Continued)

(58) Field of Classification Search
CPC .. G06K 7/1417; G06K 7/1439; G06K 7/1447; G06K 7/1473
See application file for complete search history.

(56) References Cited

U.S. PATENT DOCUMENTS 5,262,626 A 11/1993 Goren et al.
5,278,398 A 1/1994 Pavlidis et al.
(Continued)

OTHER PUBLICATIONS

U.S. Appl. No. 12/885,155 U.S. Pat. No. 8,851,378, filed Sep. 17, 2010, System and Method for Recognizing Deformed Linear Barcodes From a Stream of Varied-Focus Video Frames.
(Continued)

*Primary Examiner* — Thien M Le
*Assistant Examiner* — April A Taylor
(74) *Attorney, Agent, or Firm* — Faegre Drinker

(57) ABSTRACT

In a system and method of recognizing a barcode from a stream of video frames, a processor-implemented camera module receives a stream of video frames, with at least one video frame including a barcode. A processor-implemented barcode blur estimate module estimates an amount of defocus blur in a video frame. The processor-implemented barcode blur estimate module further estimates an identity of the barcode. A processor-implemented barcode localization module identifies a region of the video frame containing the barcode. A processor-implemented barcode geometric modeler module generates a geometric model of the barcode that includes an identified barcode deformity. A processor-implemented barcode decoder module decodes the barcode from the video frame using the estimated amount of defocus blur, the estimated identity of the barcode, and the geometric model of the barcode.

13 Claims, 10 Drawing Sheets

Related U.S. Application Data continuation of application No. 14/488,191, filed on Sep. 16, 2014, now Pat. No. 9,117,131, and a continuation of application No. 12/885,155, filed on Sep. 17, 2010, now Pat. No. 8,851,378.

(60) Provisional application No. 61/245,635, filed on Sep. 24, 2009.

(52) U.S. Cl.
CPC ......... *G06K 7/1413* (2013.01); *G06K 7/1443* (2013.01); *G06K 7/1447* (2013.01); *G06K 7/1478* (2013.01)

(56) References Cited

U.S. PATENT DOCUMENTS

| | | | | |
|---|---|---|---|---|
| 8,260,074 | B2* | 9/2012 | Lin | G06T 7/571 382/167 |
| 8,284,295 | B2* | 10/2012 | Takahashi | G02B 7/34 348/352 |
| 8,851,378 | B2* | 10/2014 | Powers | G06K 7/14 235/454 |
| 8,851,382 | B2* | 10/2014 | Powers | G06K 7/14 235/454 |
| 9,117,131 | B2* | 8/2015 | Powers | G06K 7/14 |
| 9,275,264 | B2 | 3/2016 | Powers et al. | |
| 10,410,030 | B2* | 9/2019 | Powers | G06K 7/1473 |
| 2005/0006479 | A1 | 1/2005 | He et al. | |
| 2007/0211148 | A1 | 9/2007 | Lev et al. | |
| 2009/0001170 | A1 | 1/2009 | He | |
| 2009/0001173 | A1 | 1/2009 | Sevier et al. | |
| 2009/0108071 | A1 | 4/2009 | Carlson | |
| 2009/0277962 | A1 | 11/2009 | Mccloskey | |
| 2010/0187311 | A1* | 7/2010 | van der Merwe | G06K 9/183 235/462.01 |
| 2010/0189367 | A1* | 7/2010 | van der Merwe | G06K 9/183 382/217 |
| 2011/0068173 | A1 | 3/2011 | Powers et al. | |
| 2011/0068175 | A1 | 3/2011 | Powers et al. | |
| 2012/0018518 | A1 | 1/2012 | Strom et al. | |
| 2012/0104100 | A1 | 5/2012 | Gallo et al. | |
| 2012/0331140 | A1 | 12/2012 | Wang | |
| 2015/0001295 | A1 | 1/2015 | Powers et al. | |
| 2015/0001296 | A1 | 1/2015 | Powers et al. | |
| 2015/0363628 | A1 | 12/2015 | Powers et al. | |

OTHER PUBLICATIONS

U.S. Appl. No. 14/488,191 U.S. Pat. No. 9,117,131, filed Sep. 16, 2014, System and Method for Recognizing Deformed Linear Barcodes From a Stream of Varied-Focus Video Frames.
U.S. Appl. No. 12/885,221 U.S. Pat. No. 8,851,382, filed Sep. 17, 2010, System and Method for Estimation and Classification of Barcodes Using Heuristic and Statistical Measures.
U.S. Appl. No. 14/488,179 U.S. Pat. No. 9,275,264, filed Sep. 16, 2014, System and Method for Estimation and Classification of Barcodes Using Heuristic and Statistical Measures.
U.S. Appl. No. 14/833,184 U.S. Pat. No. 10/410,030, filed Aug. 24, 2015, System and Method for Recognizing Deformed Linear Barcodes From a Stream of Varied-Focus Video Frames.
Non Final Office Action received for U.S. Appl. No. 12/885,155 dated Jan. 23, 2013, 8 pages.
Non Final Office Action received for U.S. Appl. No. 12/885,155, dated Sep. 17, 2013, 9 pages.
Notice of Allowance received for U.S. Appl. No. 12/885,155 dated Jun. 6, 2014, 7 pages.
Response to Non-Final Office Action Filed on Apr. 23, 2013 for U.S. Appl. No. 12/885,155 dated Jan. 23, 2013, 13 pages.
Response to Non-Final Office Action Filed on Dec. 17, 2013, for U.S. Appl. No. 12/885,155 dated Sep. 17, 2013, 14 pages.
Non Final Office Action received for U.S. Appl. No. 12/885,221 dated Apr. 1, 2013, 7 pages.
Notice of Allowance received for U.S. Appl. No. 12/885,221 dated Jun. 9, 2014, 8 pages.
Notice of Allowance received for U.S. Appl. No. 12/885,221 dated Oct. 7, 2013, 11 pages.
Response to Non-Final Office Action Filed on Jul. 1, 2013 for U.S. Appl. No. 12/885,221 dated Apr. 1, 2013, 10 pages.
Final Office Action received for U.S. Appl. No. 14/488,179 dated Apr. 10, 2015, 8 pages.
Non Final Office Action received for U.S. Appl. No. 14/488,179 dated Nov. 20, 2014, 9 pages.
Non-Final Office Action received for U.S. Appl. No. 14/488,179 dated Oct. 7, 2014, 9 pages.
Notice of Allowance received for U.S. Appl. No. 14/488,179 dated Oct. 26, 2015, 10 pages.
Preliminary Amendment for U.S. Appl. No. 14/488,179, filed Oct. 1, 2014, 7 pages.
PTO Response to Rule 312 Communication for U.S. Appl. No. 14/488,179 dated Jan. 5, 2016, 2 pages.
Response to Final Office Action filed on Jun. 10, 2015, for U.S. Appl. No. 14/488,179, dated Apr. 10, 2015, 8 pages.
Response to Non-Final Office Action Filed on Feb. 20, 2015 for U.S. Appl. No. 14/488,179, dated Nov. 20, 2014, 10 pages.
Non Final Office Action received for U.S. Appl. No. 14/488,191 dated Nov. 24, 2014, 8 pages.
Non Final Office Action received for U.S. Appl. No. 14/488,191 dated Oct. 7, 2014, 9 pages.
Notice of Allowance received for U.S. Appl. No. 14/488,191 dated Apr. 15, 2015, 9 pages.
Preliminary Amendment for U.S. Appl. No. 14/488,191, filed Oct. 1, 2014, 6 pages.
Response to Non-Final Office Action filed on Feb. 24, 2015 for U.S. Appl. No. 14/488,191 dated Nov. 24, 2014, 9 pages.
Adelmann et al., "Toolkit for Bar Code Recognition and Resolving on Camera Phones—Jump Starting the Internet of Things", Retrieved from the Internet: <URL: http://citeseerx.ist.psu.edu/viewdoc/summary?doi=1 0.1.1.69.5519>, 2006, 8 pages.
Chai et al., "Locating and Decoding EAN-13 Barcodes from Images Captured by Digital Cameras", 5th International Conference on Information Communications & Signal Processing, 2005, 5 pages.
Chien, "Mobile Phone Bar Code Reader", Thesis submitted to the School of Information Technology and Electrical Engineering at the University of Queensland, Oct. 24, 2007, 69 pages.
Gallo, "Reading Challenging Barcodes with Cameras", Workshop on Applications of Computer Vision (WACV), Dec. 7, 2009, 6 pages.
Liyanage, "Efficient Decoding of Blurred, Pitched, and Scratched Barcode Images", Retrieved from the Internet: <URL: http://www.cs.ucf.edu/-janaka/projects/barcode/barcode paper.pdf>, Aug. 2007, 6 pages.
Ohbuchi et al., "Barcode Readers using the Camera Device in Mobile Phones", International Conference on Cyberworlds, 2004, 6 pages.
Rohs et al., "Using Camera-Equipped Mobile Phones for Interacting with Real-World Objects", Retrieved from the Internet: <URL: http://citeseer.ist.psu.edu/viewdoc/summary?doi=1 0.1.1.2.7195>, 2004, 7 pages.
Tan, "JPEG Color Barcode Images Analysis: A Camera Phone Capture Channel Model with Auto-Focus", International Journal of Signal Processing, Image Processing and Pattern Recognition, vol. 2, No. 4, Dec. 2009, 10 pages.
Terebes et al., "Camera Phone Based Barcode Decoding System", Acta Technica Napocensis, vol. 49, No. 3, 2008, pp. 57-62.
Wachenfeld et al., "Robust Recognition of 1-D barcodes Using Camera Phones", 19th International Conference on Pattern Recognition, 2008, 4 pages.
Applicant-Initiated Interview Summary received for U.S. Appl. No. 14/833,184, dated Oct. 2, 2017, 2 pages.
Final Office Action received for U.S. Appl. No. 14/833,184, dated Jul. 3, 2017, 8 pages.
Non-Final Office Action received for U.S. Appl. No. 14/833,184, dated Dec. 7, 2017, 10 pages.

(56) References Cited

OTHER PUBLICATIONS

Non-Final Office Action received for U.S. Appl. No. 14/833,184, dated Jan. 13, 2017, 11 pages.
Non-Final Office Action received for U.S. Appl. No. 14/833,184, dated Sep. 10, 2018, 7 pages.
Notice of Allowance received for U.S. Appl. No. 14/833,184, dated Apr. 25, 2019, 8 pages.
Preliminary Amendment for U.S. Appl. No. 14/833,184, filed Sep. 8, 2015, 7 pages.
Response to Final Office Action filed on Oct. 3, 2017 for U.S. Appl. No. 14/833,184 dated Jul. 3, 2017, 9 pages.
Response to Non-Final Office Action filed on Jan. 10, 2019, for U.S. Appl. No. 14/833,184, dated Sep. 10, 2018, 10 pages.
Response to Non-Final Office Action filed on May 12, 2017 for U.S. Appl. No. 14/833,184 dated Jan. 13, 2017, 11 pages.
Response to Non-Final Office Action filed on May 4, 2018 for U.S. Appl. No. 14/833,184 dated Dec. 7, 2017, 13 pages.

* cited by examiner

SYSTEM AND METHOD FOR RECOGNIZING DEFORMED LINEAR BARCODES FROM A STREAM OF VARIED FOCUS VIDEO FRAMES

CROSS-REFERENCE TO RELATED APPLICATIONS

This application is a continuation of U.S. patent application Ser. No. 14/833,184, filed Aug. 24, 2015, issued as U.S. Pat. No. 10,410,030, which is a continuation of U.S. patent application Ser. No. 14/488,191, filed Sep. 16, 2014, issued as U.S. Pat. No. 9,117,131, which is a continuation of U.S. patent application Ser. No. 12/885,155, filed on Sep. 17, 2010, issued as U.S. Pat. No. 8,851,378, which claims the benefit of U.S. Provisional Application Ser. No. 61/245,635, filed on Sep. 24, 2009. This application is related to U.S. application Ser. No. 14/488,179, filed Sep. 16, 2014, which is a continuation of Ser. No. 12/885,221, filed Sep. 17, 2010. Each of these applications is incorporated herein by reference in its entirety.

TECHNICAL FIELD

This application relates generally to the field of barcode processing, and more specifically, to a system and method for estimating and classifying barcodes using heuristic and statistical measures.

BACKGROUND

Barcodes are widely used to identify and track goods and documents, among other things. A commonly used barcode is a linear barcode, which is a machine-readable representation of data that represents data in the widths and spacing of parallel lines. Different linear barcode formats have emerged over time, with Universal Product Code (UPC) and European Article Number (EAN) being two commonly used barcode formats.

A commonly used UPC code is a UPC-A barcode. A UPC-A barcode is characterized by twelve decimal digits, preceded by a start delimiter and followed by an end delimiter. In the middle of the twelve digit barcode, between the sixth and seventh digits, is a middle delimiter. The start, middle, and end delimiters function to separate the twelve digits into two groups of six digits. The start and end delimiters are characterized by a "101" bit pattern, which may be visualized as two vertical black guard bars with a white space between the bars. The middle delimiter is characterized by a "01010" bit pattern, which may be visualized as a white space, a black vertical guard bar, a white space, a black vertical guard bar, and a white space. Between the start and middle delimiters are six "left" digits, and between the middle and end delimiters are six "right" digits. Each digit is represented by a seven-bit code, with a binary '1' value represented by a vertical black bar and a binary '0' value represented by a vertical white space. The seven-bit code for each digit is represented visually as two bars and two spaces, with each of the bars and spaces having varying width depending on the digit. To distinguish between "left" digits and "right" digits, a "left" digit seven-bit code is the inverse of a "right" digit seven-bit code. The following table illustrates the seven-bit code values for each barcode digit.

| Digit | Left Pattern | Right Pattern |
|---|---|---|
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

Among the twelve digits of the barcode, the first, or leftmost, digit is a prefix digit, while the last, or rightmost digit, is an error correcting check digit.

A commonly used EAN barcode is an EAN-13 barcode. The EAN-13 barcode is a superset of a UPC-A barcode. The EAN-13 barcode uses thirteen digits broken up into four components: a prefix, which may be two or three digits long; a company number, which may be four to six digits long, an item reference number, which may be two to six digits, and a single checksum digit. EAN-13 barcodes differ from UPC-A barcodes in that the data digits are split into three groups: a first digit, a first group of six digits, and a second group of six digits. The first group of six digits is encoded according to one of two encoding schemes, one of which has even parity and one of which has odd parity, while the second group of six digits is encoded as bitwise complements to the digits of the first group having the odd parity encoding scheme.

Barcodes are commonly read using fixed or mounted barcode scanners, such as those found as part of a point-of-sale system, or using commercial laser-based, handheld barcode readers, which are often attached to a point-of-sale system. However, with the proliferation of handheld and mobile devices, there is a growing interest in leveraging the ability of these devices to read barcodes.

BRIEF DESCRIPTION OF THE DRAWINGS

The drawings illustrate generally, by way of example, but not by way of limitation, various embodiments discussed in the present document.

DETAILED DESCRIPTION

Although embodiments of the disclosure have been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In various embodiments, a system and method to recognize a deformed linear barcode from varied-focus video frames are disclosed. A processor-implemented camera module may receive a stream of video frames. The stream of video frames may include a barcode contained therein. A processor-implemented barcode blur estimate module may estimate an amount of defocus blur in a video frame of the stream of video frames. The processor-implemented barcode blur estimate module may estimate an identity of the barcode using a backward extraction technique. A processor-implemented barcode localization module may identify a region of the video frame containing the barcode. A processor-implemented geometric modeler module may generate a geometric model of the barcode that includes an identified barcode deformity. A processor-implemented barcode decoder module may decode the barcode using the estimated amount of defocus blur, the estimated barcode identity, and the geometric model of the barcode.

Figure 1:
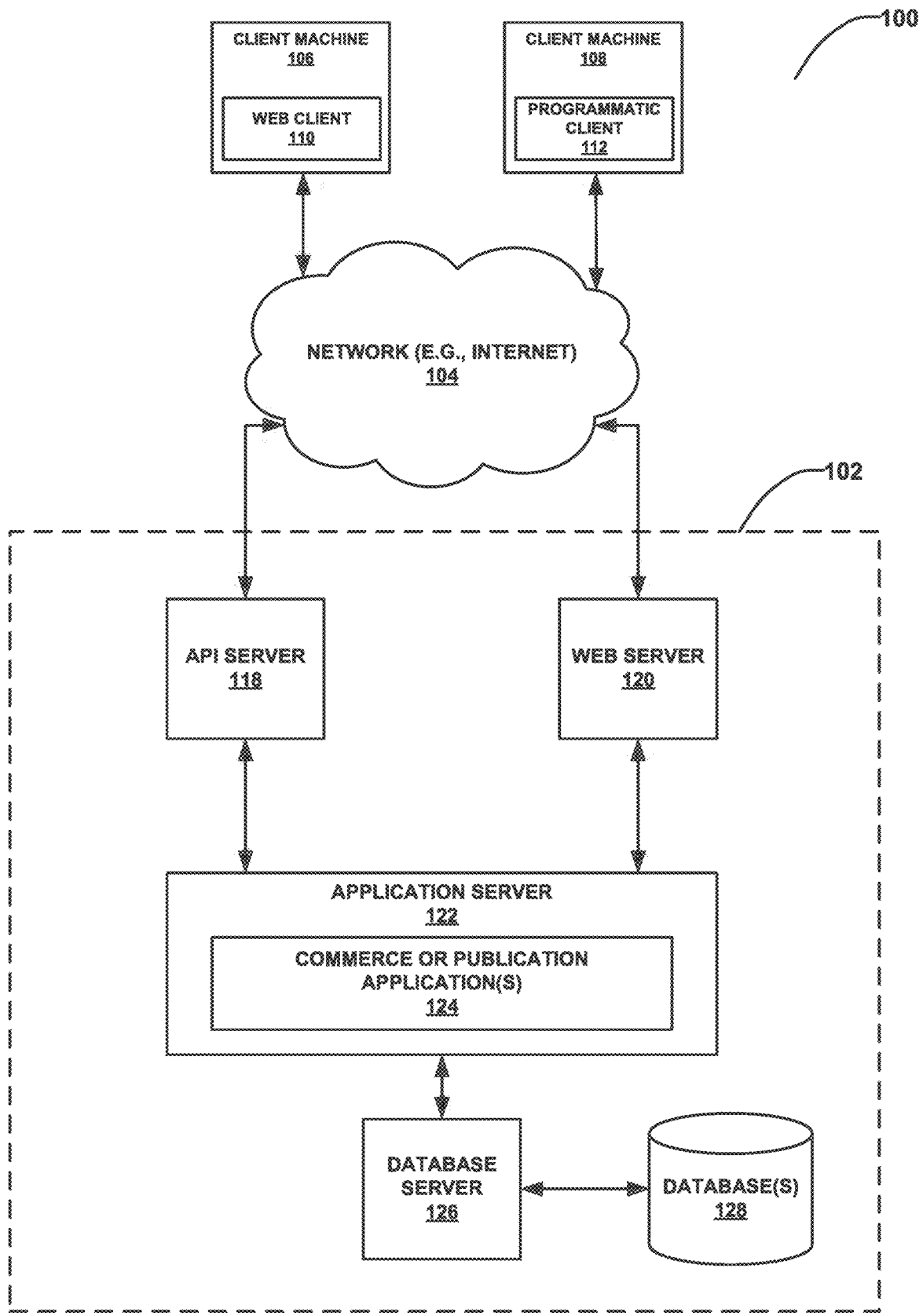
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a commerce or publication/publisher 102 where clients may communicate and exchange data within the network system 100. The data may pertain to various functions (e.g., product lookups, product or price comparisons, and online item purchases) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as barcode-related data, product profiles, product reviews, product comparisons, price comparisons, product recommendations and identifiers, product and service listings associated with buyers and sellers, auction bids, and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application. It can be appreciated that in various example embodiments, the client machines 106, 108 may be associated with a buyer, a seller, a payment service provider, or a shipping service provider, each in communication with the network-based publisher 102 and, optionally, each other. The buyers and sellers may be any one of individuals, merchants, or service providers, among other things. The role of a user of client machines 106, 108 is immaterial to the discussion herein and the foregoing examples are merely examples of the types of users who may operate client machines 106, 108.

Client machines 106, 108 executing web client 110 or programmatic client 112 may use the web client 110 or programmatic client 112 to read a barcode. In an example embodiment, client machines 106, 108 may be handheld or mobile devices. Client machines 106, 108 may have camera functionality, implemented in example embodiments as a built-in camera or external camera. In an example embodiment, the built-in camera or external camera may have a fixed focus lens. In an example embodiment, client machines 106, 108 may capture and decode a barcode using web client 110 or programmatic client 112 (e.g., client app). Client machines 106, 108 may transmit decoded barcode information to the network-based publisher 102 to retrieve additional information concerning the decoded barcode.

Referring to the network-based publisher 102, an application program interface (API) server 118 and a web server 120 are coupled to, and provide programmatic and web interfaces respectively to, one or more application servers 122. The application servers 122 host one or more publication or commerce application(s) 124. The application servers 122 are, in turn, shown to be coupled to one or more database server(s) 126 that facilitate access to one or more database(s) 128.

In one embodiment, the web server 120 and the API server 118 communicate and receive data, such as in the form of decoded barcode data, pertaining to products, listings, and transactions, among other things, via various user input tools. For example, the web server 120 may send and receive data to and from a barcode reading webpage on a browser application (e.g., web client 110) operating on a client machine (e.g., client machine 106). The API server 118 may send and receive data to and from a barcode reading app (e.g., programmatic client 112) running on another client machine (e.g., client machine 108).

The commerce or publication application(s) 124 may provide a number of commerce and publisher functions and services (e.g., listing, product lookup, price comparison, payment, etc.) to users who access the network-based publisher 102. For example, the commerce and publication application(s) 124 may provide a number of services and functions to users for listing goods for sale, facilitating transactions, and reviewing or comparing products and prices of products. Data pertaining to the services and functions provided by the commerce and publication application(s) 124 may be retrieved from database(s) 128 via database server 126.

Figure 2:
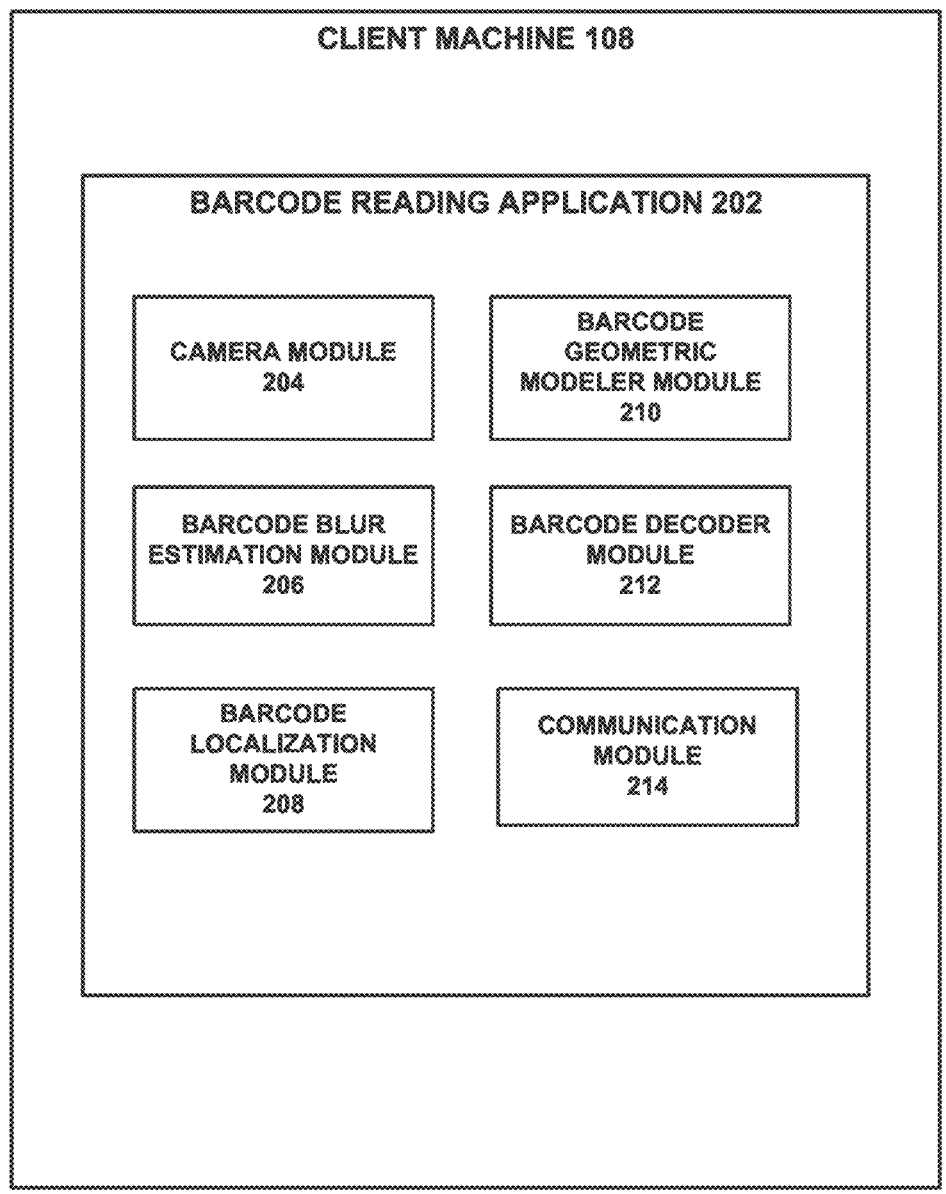
FIG. 2 is a block diagram illustrating an example embodiment of various client modules that may used to execute the processes described herein.

FIG. 2 is a block diagram illustrating an example embodiment of various client modules that may used to execute the processes described herein. For example purposes only, FIG. 2 will be described with reference to client machine 108 of FIG. 1, although one of ordinary skill in the art will recognize that any client device may be used to implement the client modules discussed herein. Client machine 108 may include various modules that perform various functions. The modules may be implemented as software, hardware, firmware, or any combination thereof. Multiple functions may be performed in one or more modules as desired, and the embodiments described are merely examples. The software may be executed, at least in part, on one or more of at least one computer processor, digital signal processor, Application Specific Integrated Circuit (ASIC), microprocessor, or other type of processor operating on a system, such as a personal computer (PC), set top box, personal digital assistant (PDA), smart phone, server, router, or other device capable of processing data, including network interconnection devices.

Client machine 108 may execute a barcode reading application 202. Barcode reading application 202 may include or call at least a camera module 204, a barcode blur estimation module 206, a barcode localization module 208, a barcode geometric modeler module 210, a barcode decoder module 212, and a communication module 214, each of which may reside within client machine 108.

Camera module 204 may be an internal or external camera for use with the client machine 108. For example, many mobile devices, such as the Apple iPhone®, Research in Motion Blackberry®, and devices running the Google Android® operating system, include camera devices enabling users to capture images or video. In an example embodiment, camera module 204 includes a fixed focus lens. In further example embodiments, camera module 204 may include a camera flash device, such as a light-emitting diode (LED) flash. Camera module 204 may include software capable of implementing digital zoom for capturing images or video. In an example embodiment, camera module 204 may capture video frames in standard or high definition. The video frames may be provided as a stream of video frames to the barcode reading application 202 or any components thereof.

Barcode blur estimation module 206 determines when a client barcode reading application should attempt to read and decode a barcode. Barcode reading application 202 may interface with camera module 204 to receive video frames from camera module 204. In an example embodiment, upon execution of barcode reading application 202, client machine 108 may activate camera module 204, and video frames captured by camera module 204 may be provided to barcode blur estimation module 206. Barcode reading application 202 may decode a barcode directly from one or more video frames captured or received by the camera module 204. In other words, in an example embodiment, barcode reading application 202 does not need to capture an image or take a picture of a barcode in order to read and process the barcode.

In order to maximize the success of reading a barcode from a series of video frames, barcode blur estimation module 206 evaluates a barcode contained within the stream of video frames to determine an appropriate reading environment. Barcode blur estimation module 206 may estimate the defocus blur and motion blur contained in the video frames. Defocus blur may arise from the use of a fixed focus camera to capture video frames containing a barcode that is close to the camera. If the amount of defocus blur is greater than a predetermined acceptable threshold amount of defocus blur, barcode reading application 202 will not attempt to read the barcode from the video frames. Once the amount of defocus blur is determined to be less than the predetermined threshold, barcode reading application 202 will attempt to decode the barcode. Thus, unlike other barcode reading applications, barcode reading application 202 will not expend unnecessary resources attempting to decode a barcode contained in a video frame suffering from defocus blurriness.

In an example embodiment, after a barcode is located in the stream of video frames and a 1D signal is obtained, the barcode blur estimation module 206 estimates the defocus blur by computing a difference in pixel intensity across pixels in the video frames that correspond to the barcode. In an example embodiment, the pixels may be selected from a horizontal cross-section of the barcode. This difference across pixels is summed up. In an example embodiment in which defocus blur is present in a video frame, the pixels may be smeared together such that the summed differences between pixels may be less than a perfectly sharp barcode image. The difference sum may be used in an equation that predicts the radius of the defocus blur. The equation used may be derived from testing performed over a large set of barcodes. The equation may produce an initial estimate of the defocus blur present in the video frames.

Known barcode decoding methods attempt to perform forward image analysis to decode the barcode, where a signal thought to contain a barcode is analyzed to identify the exact barcode displayed in the signal. This analysis attempts to identify peaks and valleys in the signal corresponding to pixel intensity, with a peak representing a black bar and a valley representing a white space. If the analysis is unable to determine the exact barcode contained in the signal, sharpening and other refinement of the signal are performed to obtain more distinct peaks and valleys. In other words, a forward image analysis starts with an unknown barcode and attempts to identify the exact barcode shown. The forward image analysis approach to decoding a barcode can be inefficient and ineffectual as a failed attempt to decode the barcode will cause the forward image analysis approach to restart the analysis anew. Thus, depending on the quality of the barcode image, many attempts at decoding the barcode may occur, and even then, the exact barcode may not be determined, due to, among other things, the presence of blur.

The barcode blur estimation module 206 may use a backward extraction process to determine the identity of a barcode contained within one or more video frames. Using the determined guess or assumption of the barcode, the barcode blur estimation module 206 can narrow the number of possibilities of the identity of the barcode to a manageable number (e.g., 10 to 30 possible valid patterns) from the overall universe of possible barcodes. The barcode blur estimation module 206 may compare the assumed barcode to each of the possible valid barcode patterns to identify a match. Thus, the barcode blur estimation module 206 may formulate an assumption of the barcode and apply its assumption or expectation to narrow the possible universe of potential applicable barcodes. The calculation of the estimated defocus blur and the use of the backward extraction process may inform the barcode reading application 202 that a video frame of a sequence of video frames is in a condition suitable for reading.

Barcode localization module 208 operates in conjunction with barcode blur estimation module 206 to focus a search for a barcode within an area of a video frame. By searching for and processing a portion of a video frame containing a barcode, barcode reading application 202 does not expend unnecessary resources or time in processing an entire video frame. Barcode localization module 208 may use the known format of certain barcodes to aid in determining an area of the video frame in which to focus. As barcode localization module 208 may be forced to operate in blurry conditions, barcode localization module 208 also operates with the knowledge that despite the presence of blurriness in a video frame, barcode elements have a vertical correlation to each other, and often the vertical correlation between barcode elements (e.g., black vertical bars and white spaces) survives or is distinguishable among the blurriness.

Operating under these assumptions, barcode localization module 208 may sample horizontal scanlines at various points throughout the video frame. In an example embodiment, barcode localization module 208 may sample a horizontal scanline at one point in the video frame and compare the scanline to a different horizontal scanline taken at a nearby point (e.g., three pixels lower than the original scanline). If the two scanlines match and indicate the presence of a vertical correlation of barcode elements, barcode localization module 208 may assume that it has discovered the location of a barcode within the video frame.

Barcode localization module 208 may then use the known format of linear barcodes to further identify the region of the video frame where it believes the barcode resides. For example, as discussed herein, a UPC or EAN barcode may include start and end guard bars that delineate the beginning and end of a barcode. The start and end guard bars are characterized as having the same pattern of bars and spaces (and data) irrespective of the encoded content within the barcode. The barcode localization module 208 may use the general location identified by the comparison of horizontal scanlines to search for known barcode identifying features, such as the start and end guard bars. Once identified, the location of the start and end guard bars of the barcode enable the barcode localization module 208 to mark the left and right bounds of the barcode. Using the horizontal scanline samples, the barcode localization module 208 may mark the upper and lower bounds of the barcode. Barcode localization module 208 may continually refine the bounds of the barcode until it determines that the barcode has been identified, at which point a boundary box or boundary identifiers surrounding the barcode are locked in place.

Barcode geometric modeler module 210 may attempt to compensate for geometric deformities in the barcode contained within the one or more video frames by developing a geometric model for the barcode. Despite being localized, the barcode contained within a video frame may not be able to be decoded, or may not be able to be decoded efficiently. In example embodiments, the barcode may be curved, tilted, warped, or rotated, among other things. Each of these deformities may affect and hamper decoding of the barcode. For example, if a barcode is curved, the vertical black bars near the left and right ends of the barcode may appear to be skinnier than in reality due to the curvature of the barcode. As the width of a vertical bar of a barcode is used to determine the value of an encoded digit, a curved barcode can cause the barcode to be decoded incorrectly. Barcode geometric modeler module 210 may plot points throughout the barcode to develop a curve model for the barcode that accounts for the barcode being curved.

In the event the barcode is skewed or angled, the vertical bars of the barcode may not be precisely vertical. To compensate for a skewed barcode, two horizontal cross-sections of the barcode may be obtained. A vertical bar in the two horizontal cross-sections that is shifted may indicate that the barcode is skewed. To compensate for a skewed barcode, the barcode geometric modeler module 210 may calculate an angle formed by the skewed vertical bar and a vertical line corresponding to a non-skewed vertical bar.

The geometric model of the barcode developed by the barcode geometric modeler module 210 may account for barcode skew, curve, tilt, warping, and lighting conditions, among other things. The barcode geometric modeler module 210 may compare the geometric model to the barcode contained in the video frame to determine the accuracy of the model. Barcode geometric modeler module 210 may refine the geometric model over successive video frames or decoding iterations.

Barcode decoder module 212 may account for the deformities in the barcode when attempting to decode the barcode by relying on the known features of the barcode format to aid in decoding the barcode. For example, every UPC barcode will have a middle delimiter to separate a first group of six digits from a second group of six digits. As previously discussed, the middle delimiter has a constant value regardless of the content of the UPC barcode. The barcode decoder module 212 may begin the decoding of the barcode by identifying the middle delimiter. Once identified, the barcode decoder module 212 may decode the barcode elements to the left of the middle delimiter and the barcode elements to the right of the middle delimiter independently. The decoding of barcode digits may involve estimating the digits of the barcode based on the bars and spaces of the barcode.

It is to be appreciated that while barcode decoder module 210 may first identify a middle delimiter of a UPC code when decoding a barcode, other types or formats of barcodes may be decoded differently. For example, other types of barcodes may not use a middle delimiter to separate a first group of barcode digits from a second group of barcode digits. For these and other types of barcodes, rather than concentrate on identifying a middle delimiter, barcode decoder module 210 may attempt to identify and decode an area of the barcode having a concentration of information or data.

Barcode reading application 202 may call or execute each of the barcode blur estimation module 206, barcode localization module 208, barcode geometric modeler module 210, and barcode decoder module 212 for each attempted decoding. In an example embodiment, the foregoing modules 206, 208, 210, 212 may be executed simultaneously for each attempted decoding. With each iteration, barcode reading application 202 may refine its estimate of the digits encoded in the barcode. The estimated digits may be compared to the check sum digit of the barcode to determine the accuracy of the estimate.

Communication module 214 may transmit decoded barcode data to an application server via a network and receive data from the commerce or publication system related to the barcode data. For example, barcode data may be transmitted to the publication system 102 to receive product information related to the barcode. In another example embodiment, decoded barcode data may be submitted to retrieve price or product comparison data concerning the product identified by the barcode and similar products. In an example embodiment, barcode decoding itself is performed by the client machine 108 without any network communications in the interest of preserving efficiency and speed.

Figure 3:
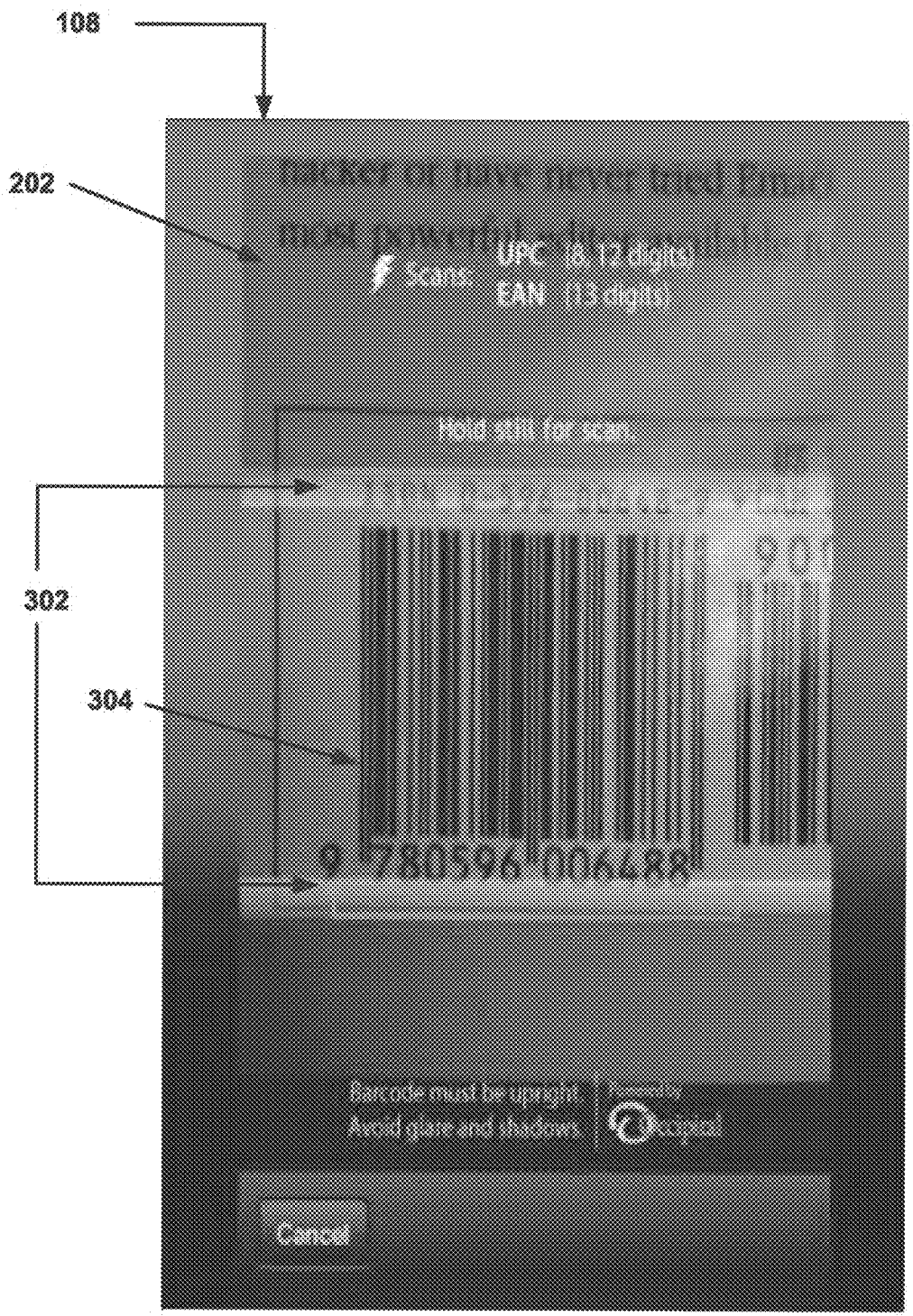
FIG. 3 is a diagram of an example embodiment of a client barcode reading application.

FIG. 3 is a diagram of an example embodiment of a client barcode reading application. Referring to FIG. 3, a client barcode reading application 202 executing on a client machine 108 is shown. Barcode reading application 202 may receive a series of video frames form a camera of the client machine 108. Barcode reading application 202 may display the video frames within a user interface that prompts a user to center a barcode 304 within a region of the user interface delineated by boundary markers 302, such as brackets or arrows. As the barcode 304 is centered within the boundary markers 302, barcode reading application 202 may execute modules (e.g., modules 206, 208, 210, 212 of FIG. 2) to determine whether the received video frame is in condition for a barcode decoding attempt.

Figure 4:
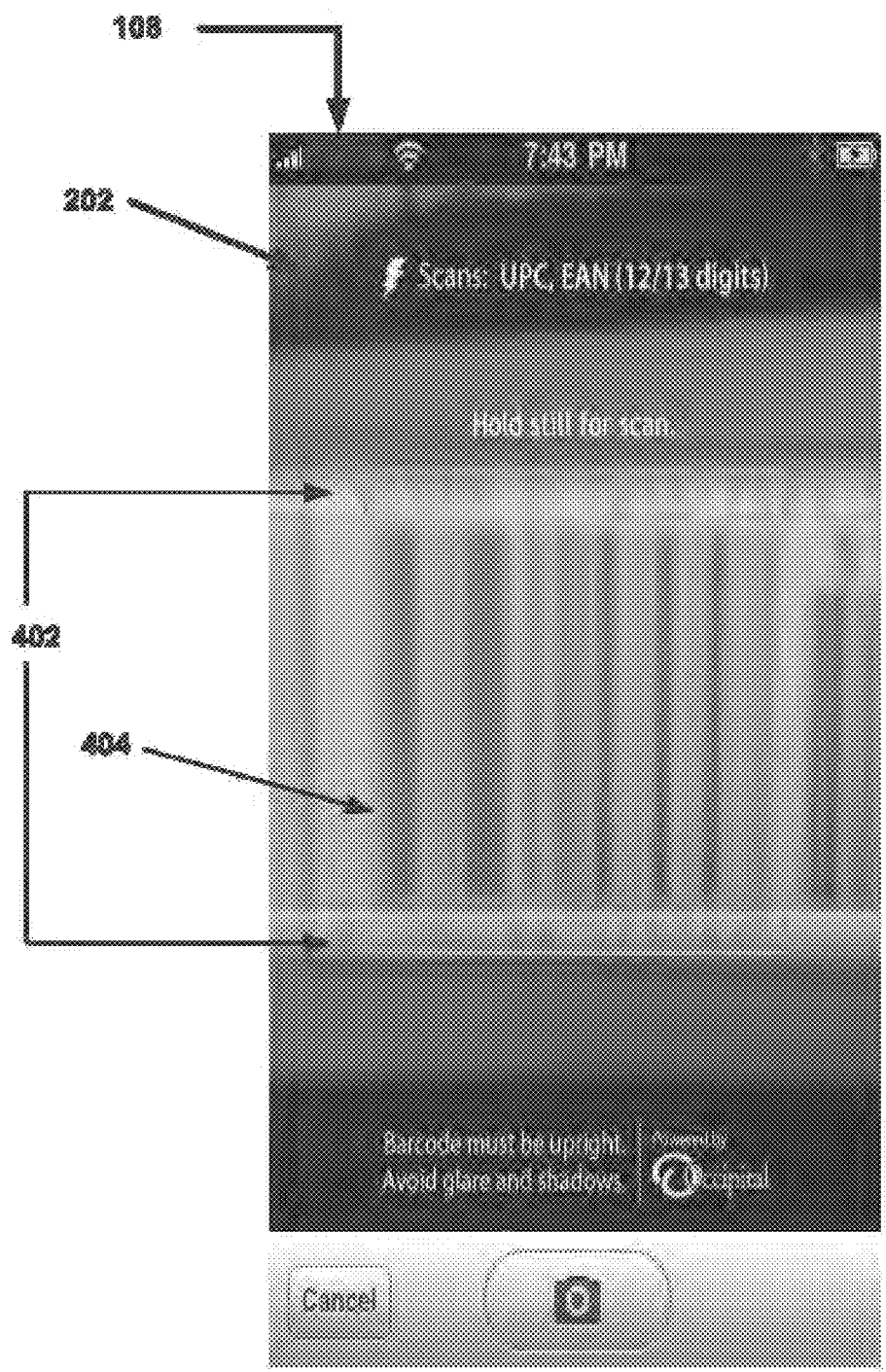
FIG. 4 is a diagram of an example embodiment of a client barcode reading application attempting to read a deformed linear barcode.

FIG. 4 is a diagram of an example embodiment of a client barcode reading application attempting to read a deformed linear barcode. Referring to FIG. 4, client barcode reading application 202 executing on client machine 108 is shown attempting to read a barcode 404 within boundaries 402. Barcode 404 is shown as suffering from defocus blurriness. Barcode 404 may be blurry due to excessive motion or a lack of, or incorrect focus in, the video frame. Barcode blur estimation module 206 of barcode reading application 202 may estimate a defocus blur for the displayed barcode by isolating a horizontal cross-section of the blurry barcode 404 and determining a difference across the pixels in the horizontal cross-section. The differences among pixels may be summed. From this determination, the summed differences among pixels is applied to an equation to predict the radius of the defocus blur. If the defocus blur exceeds a predetermined acceptable blur threshold, the barcode reading application 202 may not attempt to decode the barcode. Instead, the barcode reading application 202 may wait for another video frame in which the estimated defocus blur is lower than the predetermined acceptable blur threshold.

Figure 5:
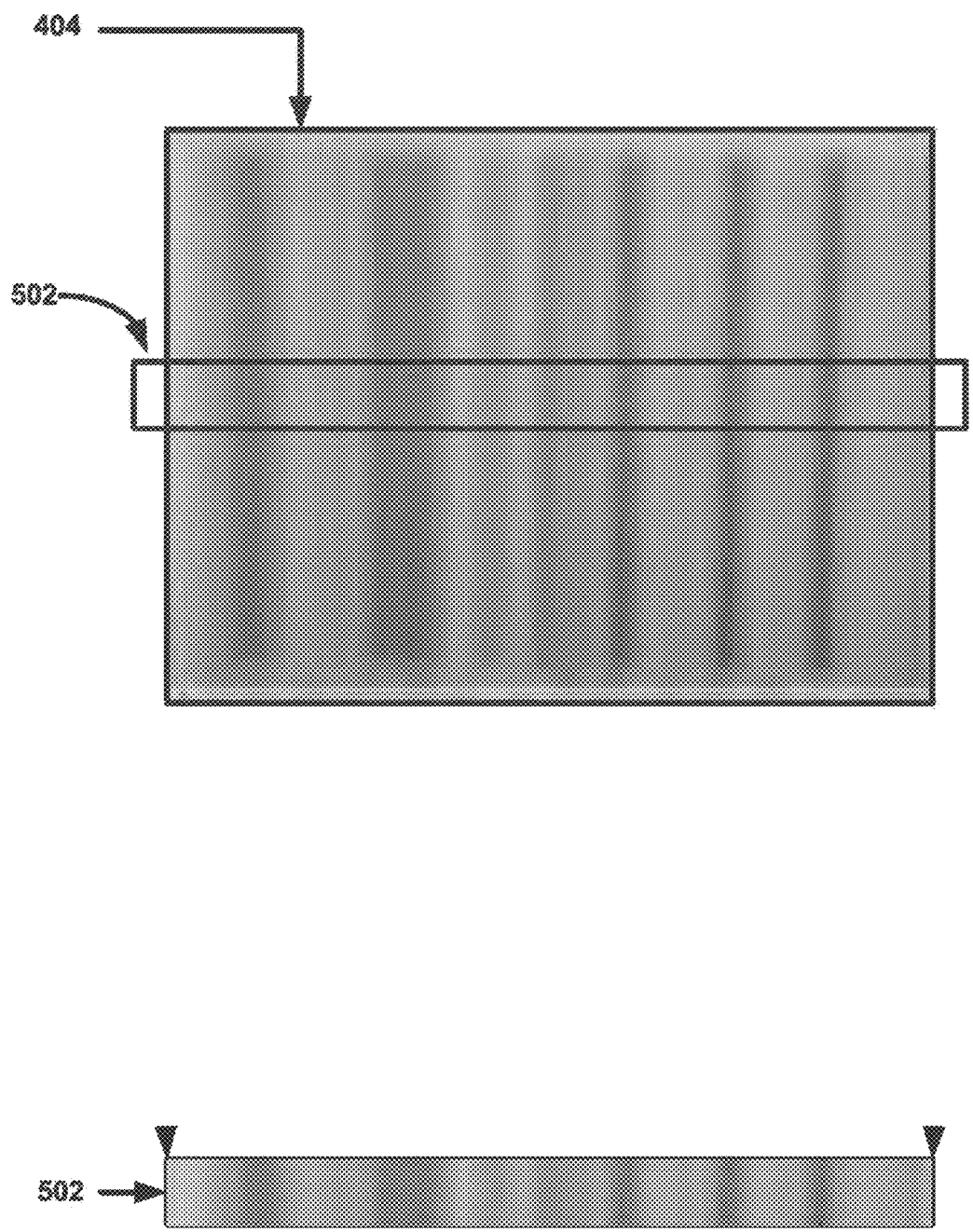
FIG. 5 is an image of an example embodiment of a deformed linear barcode.

FIG. 5 is an image of an example embodiment of a deformed linear barcode. As discussed herein with reference to FIG. 4, barcode reading application 202 may be confronted with a blurry barcode 404. In determining whether to attempt to decode blurry barcode 404, barcode blur estimation module 206 may estimate a defocus blur for the barcode 404 by isolating a horizontal cross-section 502 of the blurry barcode 404. The defocus blur for the barcode 404 may be estimated by obtaining the differences among pixels within the cross-section 502, and specifically, by examining the color degradation or blending of colors from pixel to pixel. The color degradation may result in the muting of the color intensity for vertical black bars and an increase in the color intensity for white spaces. The differences among pixels may be summed and applied to an equation used to predict a radius of defocus blur. The initial estimate of defocus blur may be used in an iterative algorithm that attempts to decode the barcode despite various barcode deformities.

Figure 6:
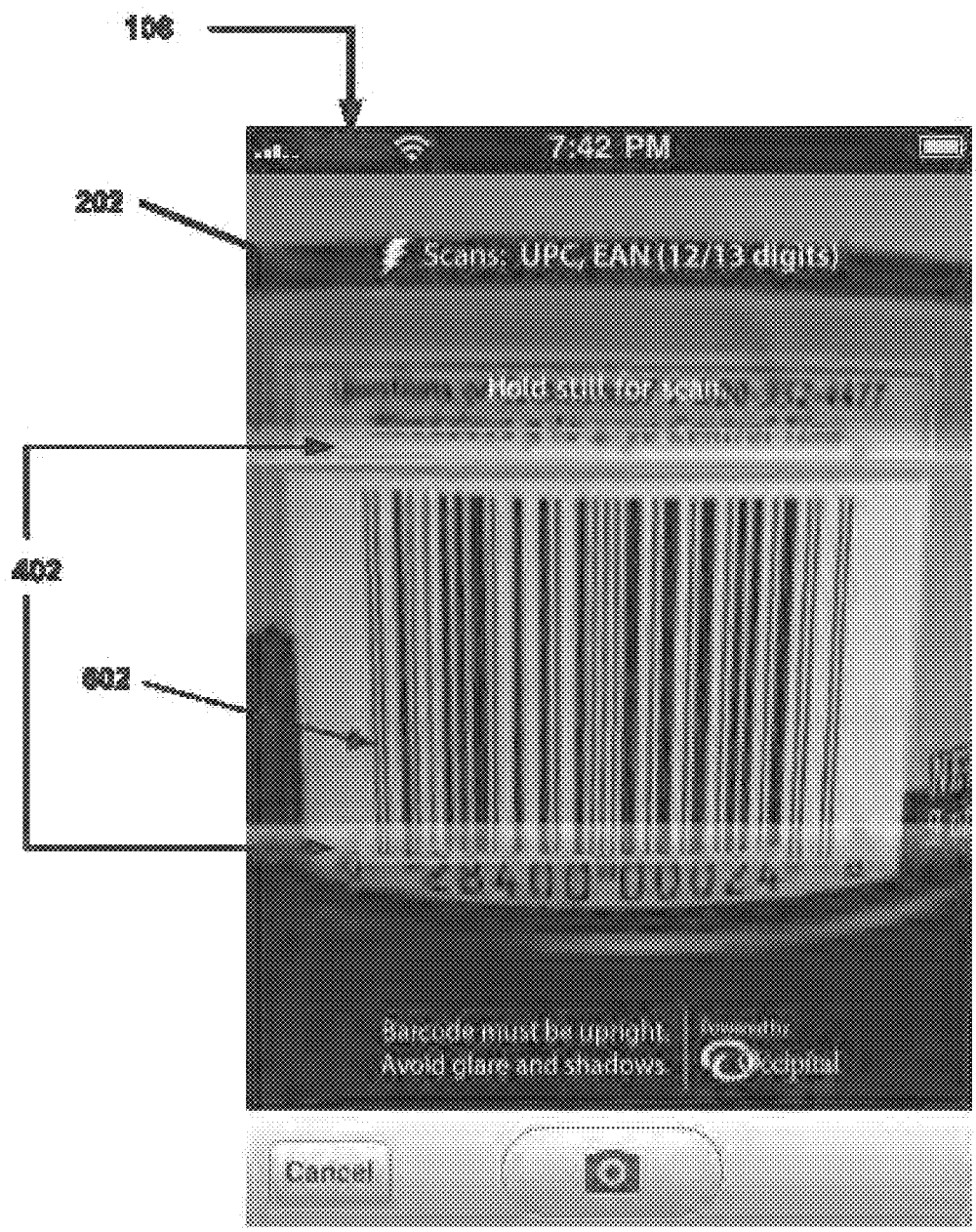
FIG. 6 is a diagram of an example embodiment of a client barcode reading application attempting to read a deformed linear barcode.

FIG. 6 is a diagram of an example embodiment of a client barcode reading application attempting to read a deformed linear barcode. Referring to FIG. 6, client barcode reading application 202 executing on client machine 108 is shown attempting to decode a curved barcode 602. Barcode reading application 202 may prompt a user directing a camera of client machine 108 to center a barcode 602 within boundaries 402. In the example embodiment of FIG. 6, barcode 602 is convexly curved. Barcode 602 may reflect a barcode that is used to label a cylindrical product, such as an aluminum soda can, ajar, or a bottle.

Barcode blur estimation module 206 may calculate a defocus blur using any of the methods described herein. Assuming for the sake of the discussion that the defocus blur is acceptable (i.e., below the predetermined acceptable blur threshold), barcode localization module 208 may localize the area of the video frame to attempt a barcode decoding. Localization is aided by the presence of boundaries 402 that barcode reading application 202 displays and uses to prompt a user to center a barcode within the display screen of the client machine 108. Barcode geometric modeler module 210 may attempt to compensate for the curvature of the displayed barcode 602 by developing a curve model for the barcode 602. The curve model may plot a series of points through the barcode and attempt to construct a curve or mathematical function to compensate for the curvature of certain barcode elements. For example, the curve model may attempt to identify non-curved data points corresponding to the curved data points using interpolation or smoothing. Barcode decoder module 212 may attempt to decode the curved barcode 602 in the region identified by barcode localization module 208 using the geometric model developed by barcode geometric modeler module 210. Each successive attempt at decoding the barcode also may update the various computed factors, such as the defocus blur, the geometric model, and the localized region.

Figure 7:
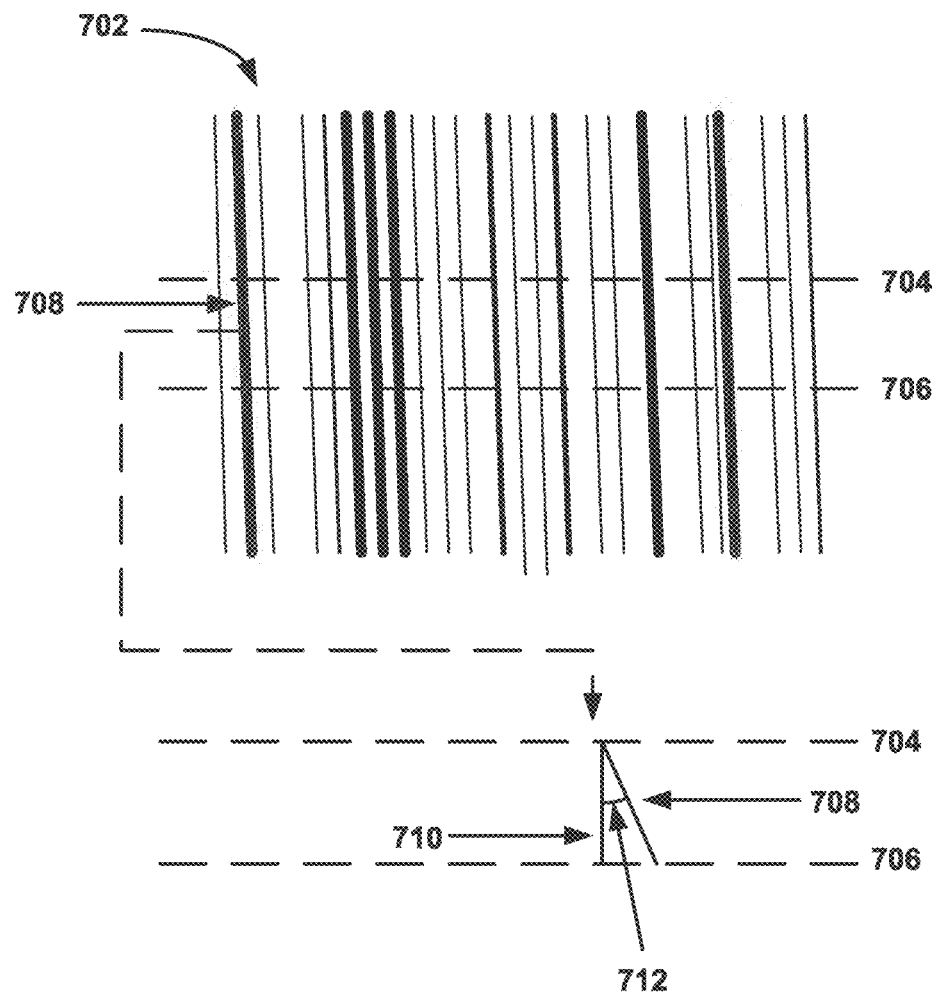
FIG. 7 is a diagram of an example embodiment of a deformed linear barcode.

FIG. 7 is a diagram of an example embodiment of a deformed linear barcode. Referring to FIG. 7, a representation of a barcode 702 suffering from skewing or tilting is shown. Tilting of a barcode may present difficulties to the barcode reading application 202 when decoding because the elements of the barcode may not be vertical. To compensate for the tilting, barcode geometric modeler module 210 may take two horizontal cross-sections 704, 706 of the tilted barcode 702 and compare the barcode elements contained within the two horizontal cross-sections. For simplicity of discussion, reference is made in FIG. 7 to only one barcode element of the barcode representation 702. Data points or segments corresponding to the barcode element at each respective point in the horizontal cross-section may illustrate the degree of tilting present in the barcode. If data points are taken, a line 708 may be drawn between the two points. An angle 712 may be calculated between the line 708 connecting the two data points of the barcode element taken from the two horizontal cross-sections and a vertical line 710. The angle 712 may instruct the barcode geometric modeler module 210, or any other module of the barcode reading application 202, of the amount of shifting necessary to straighten the barcode 702.

Figure 8:
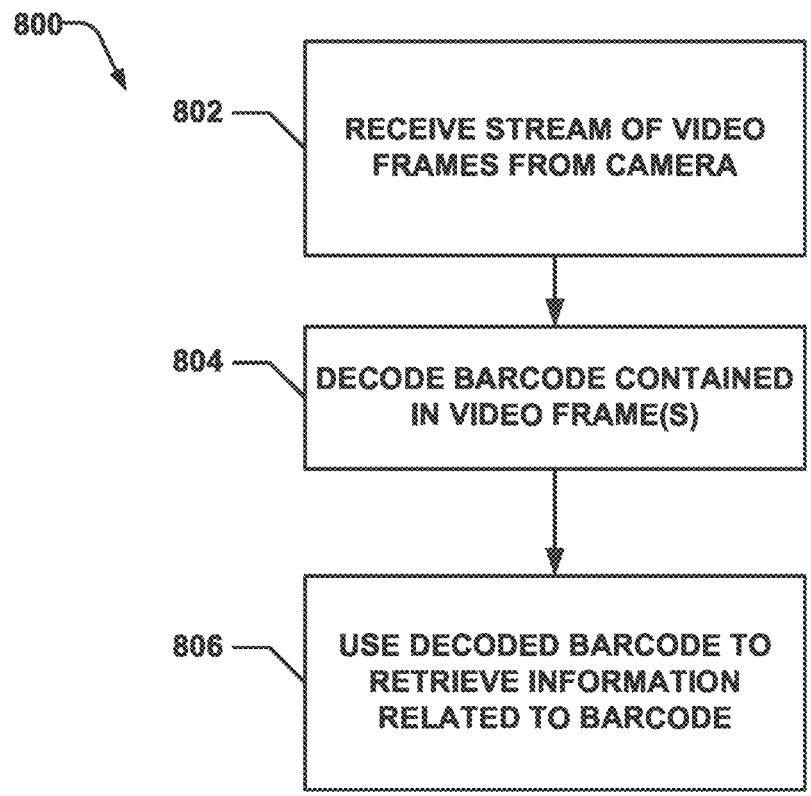
FIG. 8 is a flow chart of an example method for recognizing a barcode.

FIG. 8 is a flow chart of an example method 800 for recognizing a barcode. At operation 802, a barcode reading application 202 may receive a stream of video frames from a camera. The camera may be a component of a client device, such as a mobile device, or may be an external camera connected to the client device. At operation 804, barcode reading application 202 may decode a barcode contained within one or more of the stream of video frames. At operation 806, decoded barcode data may be communicated to a network publisher 102 to retrieve data related to the product or good identified by the barcode. The retrieved data may be a description of the product, a price of the product, a comparison of the product to related products, or a comparison of the price of the product among a variety of sellers (e.g., individuals, retailers, wholesalers), among other things. The retrieved data may be communicated back to the client device via network 104 and displayed on client machines 106, 108.

Figure 9:
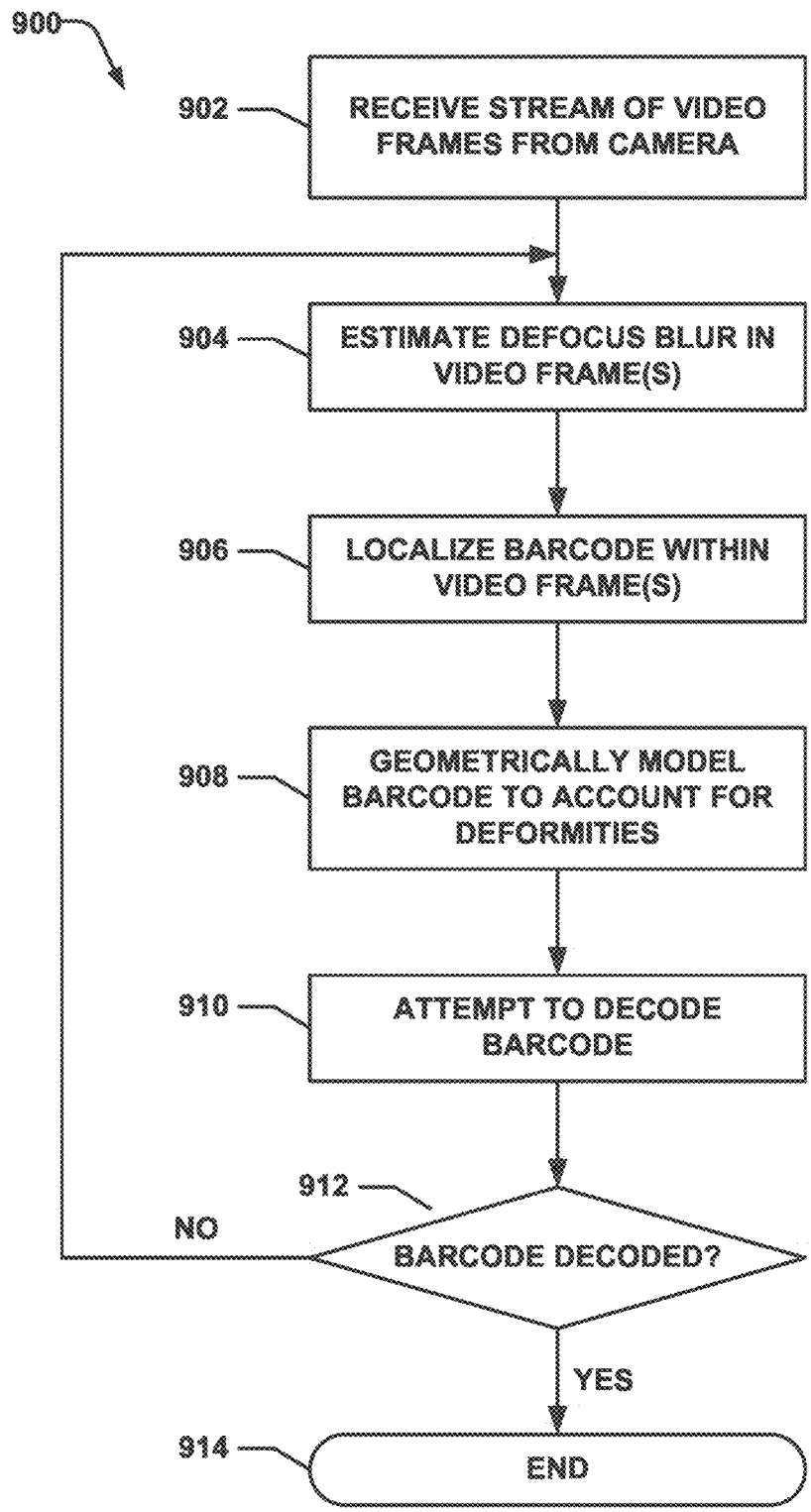
FIG. 9 is a flow chart of an example method for recognizing a barcode.

FIG. 9 is a flow chart of an example method 900 for recognizing a barcode. At operation 902, a barcode reading application 202 may receive a stream of video frames from a camera. The camera may be a component of client machines 106, 108 or may be integrated with the client device via a cable or other communicative attachment.

At operation 904, a barcode blur estimation module 206 may estimate a defocus blur of a video frame of the stream of video frames to determine an amount of blur present in the video frame due to a fixed focus camera being too close to a barcode. Barcode reading application 202 may choose to not decode a video frame if too much motion or defocus blur is present in the video frame, as the odds of success in decoding a barcode contained within a blur-filled video frame are low. The defocus blur may be calculated by examining differences among pixels in a cross-section of a displayed barcode. For example, differences among pixels may include a color degradation or bleeding among neighboring pixels in a cross-section of a displayed barcode. The effects of defocus blur may be that black pixels may bleed some of their intensity into neighboring white pixels and in turn lose some of their intensity. Defocus blur may be estimated by examining pixels within the cross-section to determine differences in pixel intensity. The differences may be aggregated and applied to an equation used to predict a radius of defocus blur for the barcode. If the defocus blur is below a predetermined threshold of acceptable blur, the barcode reading application 202 may attempt to decode the barcode. Otherwise, the barcode reading application 202 may wait for a different video frame to attempt to decode the barcode.

At operation 906, the barcode may be localized within the video frame. Localization of the barcode within the video frame may help to conserve resources in that the entire video frame would not need to be processed. Localization of the barcode may entail discovering the bounds of the barcode within the video frame. In certain example embodiments, the bounds of the barcode may be determined by searching for certain barcode landmarks that signify the beginning and end of a barcode. For example, UPC and EAN barcodes are characterized by start and end guard bars that are located at the leftmost and rightmost points of the barcode. These guard bars are encoded with a static value such that a start guard bar in every UPC code has the same encoded value and visual representation. By discovering the start and end guard bars of the barcode, the barcode may be localized to a particular region of the video frame. The upper and lower bounds of the barcode may be discovered by examining cross-sections of the barcode to identify a point where the pixel intensity of the cross-section changes from one that indicates a barcode (e.g., alternating strong and weak pixel intensities reflecting the visual elements of a barcode) to one that lacks such alternating pixel intensities.

At operation 908, the barcode contained within the video frames may be geometrically modeled to account for various linear barcode deformities. For example, if the barcode is tilted, an angle of tilt may be calculated and the barcode may be shifted using the angle of tilt. If the barcode is curved, a curve model may be developed by fitting data points of the curved barcode into a curve. The lighting by which the barcode is illuminated may be compensated for as well in the geometric model. If the barcode is rotated, a degree of rotation may be calculated and included in the geometric model.

At operation 910, the barcode may be decoded. Decoding of the barcode factors in the blur present in the video frame and the geometric model developed for the barcode. Additionally, decoding of the barcode is attempted within the localized region of the video frame as opposed to processing an entire video frame. During decoding of the barcode, the digits of the barcode are estimated and may be compared to a check sum digit in the barcode for accuracy.

At operation 912, it is determined whether the barcode has been decoded. Decoding of the barcode may involve estimating a predetermined number of barcode digits as being likely accurate. The number of barcode digits needed to be estimated as likely accurate may depend upon an adjustable threshold that quantifies the number of likely accurate digits necessary for a likely correct final result. If the decoding is not complete, the example method returns to operation 904 for the next video frame in the stream of video frames. It is contemplated that operations 904, 906, 908, and 910 are performed iteratively for each video frame in the stream of video frames. It is further contemplated that operations 904, 906, 908, and 910 may be performed simultaneously. If the barcode decoding is complete, the example method finishes at operation 914.

Figure 10:
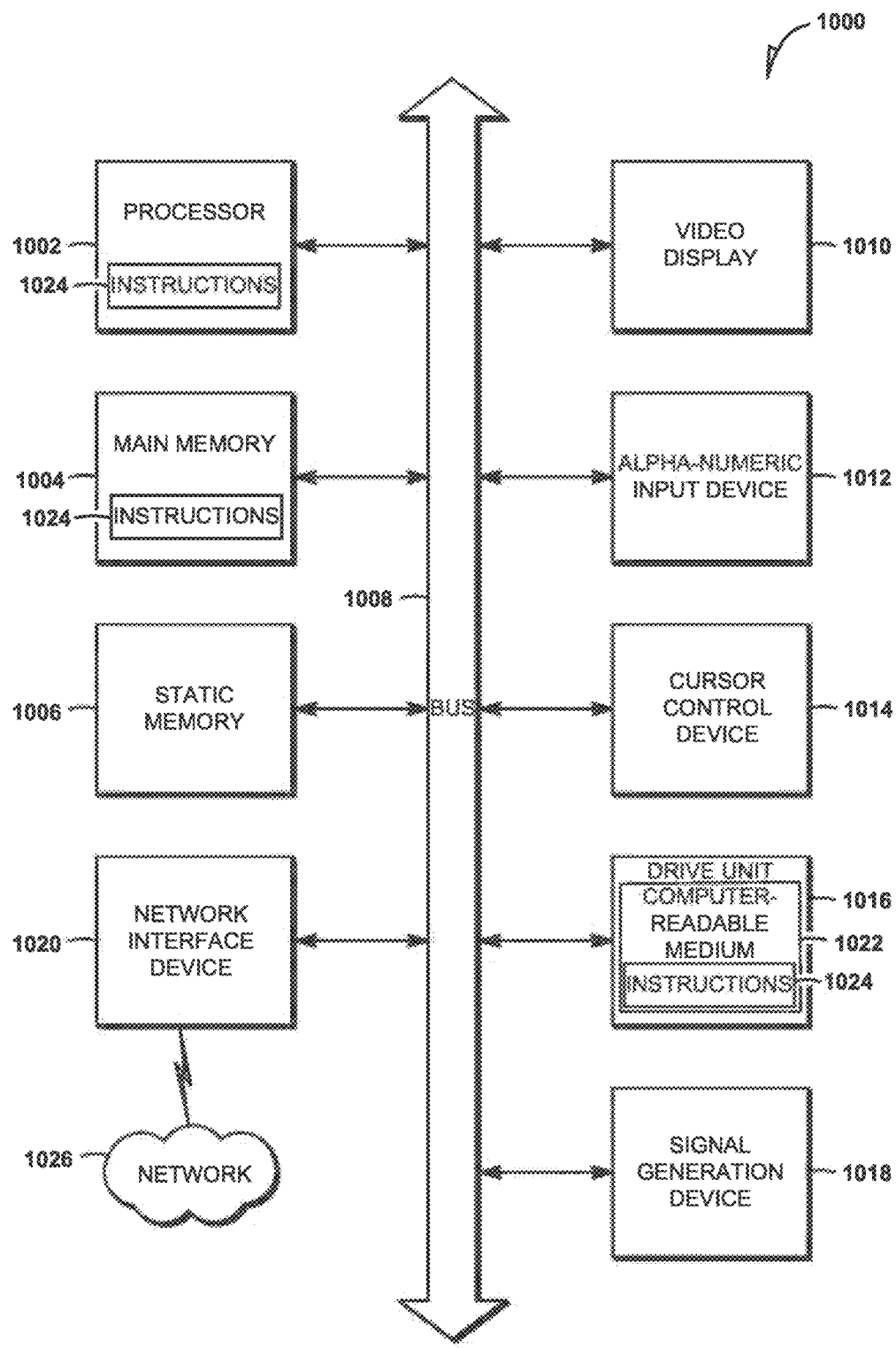
FIG. 10 shows a diagrammatic representation of a machine in the example form of a computer system within

FIG. 10 shows a diagrammatic representation of machine in the example form of a computer system 1000 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a PC, a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies disclosed herein, or that is capable of storing, encoding or carrying data structures utilized by or associated with such a set of instructions. The term "machine-readable medium" shall accordingly be taken to include, but not be limited to, solid-state memories, optical media, and magnetic media.

Certain embodiments are described herein as including logic or a number of components, modules, or mechanisms. A component or a module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component or a module mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components or modules at different times. Software may accordingly configure a processor, for example, to constitute a particular component or module at one instance of time and to constitute a different component or module at a different instance of time.

Components or modules can provide information to, and receive information from, other components or modules. Accordingly, the described components or modules may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or module may also initiate communications with input or output devices, and can operate on a resource (e.g., a collection of information).

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
    a processor-implemented barcode blur estimation module configured to:
        estimate an amount of defocus blur in a video frame of a stream of video frames, and
        estimate, in response to the amount of defocus blur not exceeding a threshold value, an identity of a barcode contained in the video frame;
    a processor-implemented barcode localization module configured to identify a region of the video frame containing the barcode;
    a processor-implemented barcode geometric modeler module configured to generate a geometric model of the barcode, the geometric model of the barcode including an identified barcode deformity; and
    a processor-implemented barcode decoder module configured to decode the barcode in the video frame using the estimated barcode identity and the geometric model of the barcode.

2. The system of claim 1, wherein the processor-implemented barcode blur estimation module is further configured to not estimate the identity of the barcode contained in the video frame in response to the amount of defocus blur exceeding the threshold value.

3. The system of claim 1, wherein the amount of defocus blur in the video frame is based on an aggregate difference in pixel intensity over a portion of one or more video frames of the video stream.

4. The system of claim 3, wherein the aggregate difference in pixel intensity is based on a selection of pixels from a horizontal cross-section of the barcode in the one or more video frames of the video stream.

5. The system of claim 3, wherein the aggregate difference estimates a radius of the defocus blur.

6. The system of claim 1, wherein the amount of defocus blur is determined based on a model derived over a set of barcodes.

7. A method comprising:
    estimating an amount of defocus blur in a video frame of a stream of video frames;
    estimating, in response to the amount of defocus blur not exceeding a threshold value, an identity of a barcode contained in the video frame;
    identifying a region of the video frame containing the barcode;
    generating a geometric model of the barcode, the geometric model of the barcode including an identified barcode deformity; and
    decoding the barcode in the video frame using the estimated barcode identity and the geometric model of the barcode.

8. The method of claim 7, further comprising by-passing the estimating of the identity of the barcode contained in the video frame in response to the amount of defocus blur exceeding the threshold value.

9. The method of claim 7, wherein the amount of defocus blur in the video frame is based on an aggregate difference in pixel intensity over a portion of one or more video frames of the video stream.

10. The method of claim 9, wherein the aggregate difference in pixel intensity is based on a selection of pixels from a horizontal cross-section of the barcode in the one or more video frames of the video stream.

11. The method of claim 9, wherein the aggregate difference estimates a radius of the defocus blur.

12. The method of claim 7, wherein the amount of defocus blur is determined based on a model derived over a set of barcodes.

13. A non-transitory computer-readable storage medium including code which when executed by at least one processor causes operations comprising:
    estimating an amount of defocus blur in a video frame of a stream of video frames;
    estimating, in response to the amount of defocus blur not exceeding a threshold value, an identity of a barcode contained in the video frame;
    identifying a region of the video frame containing the barcode;
    generating a geometric model of the barcode, the geometric model of the barcode including an identified barcode deformity; and
    decoding the barcode in the video frame using the estimated barcode identity and the geometric model of the barcode.

* * * * *